(12) United States Patent
Griffin et al.

(10) Patent No.: US 12,229,295 B2
(45) Date of Patent: Feb. 18, 2025

(54) GENERATING CUSTOMIZED POLICY DECISION POINT SERVICES FOR CONTROLLING ACCESS TO COMPUTING RESOURCES

(71) Applicant: RED HAT, INC., Raleigh, NC (US)

(72) Inventors: Leigh Griffin, Waterford (IE); Aoife Moloney, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 249 days.

(21) Appl. No.: 17/851,349

(22) Filed: Jun. 28, 2022

(65) Prior Publication Data

US 2023/0418964 A1 Dec. 28, 2023

(51) Int. Cl.
*G06F 21/62* (2013.01)
*G06F 21/55* (2013.01)

(52) U.S. Cl.
CPC ........ *G06F 21/6218* (2013.01); *G06F 21/554* (2013.01); *G06F 2221/033* (2013.01)

(58) Field of Classification Search
CPC ........................... G06F 21/554; G06F 21/6218
USPC ............................................................. 726/1
See application file for complete search history.

(56) References Cited

U.S. PATENT DOCUMENTS

| 6,578,076 B1* | 6/2003 | Putzolu ................. H04L 47/245 709/224 |
| 7,444,666 B2 | 10/2008 | Edwards et al. |
| 8,127,336 B2 | 2/2012 | Bienek et al. |
| 8,533,782 B2 | 9/2013 | Soppera et al. |
| 9,231,974 B2 | 1/2016 | Pedroza et al. |
| 9,942,271 B2 | 4/2018 | Lim |
| 2007/0022187 A1* | 1/2007 | Bellinger ................ H04L 67/34 709/225 |
| 2007/0214083 A1* | 9/2007 | Jones ..................... G06Q 40/00 705/41 |
| 2010/0024016 A1* | 1/2010 | Violleau ............... G06F 21/335 726/14 |
| 2012/0221955 A1* | 8/2012 | Raleigh ................. H04M 15/58 726/1 |
| 2017/0257379 A1* | 9/2017 | Weintraub ........... H04L 63/107 |
| 2019/0034651 A1* | 1/2019 | Griffin ................. G06F 21/6281 |
| 2020/0387821 A1* | 12/2020 | Griffin .................... G06F 15/16 |

(Continued)

OTHER PUBLICATIONS

Law et al., "UPM: Unified Policy-Based Network Management", The Edward S. Rogers Sr. Dept. of Elec. & Comp. Engineering, Univ. of Toronto, Canada; pp. 1-12.

(Continued)

*Primary Examiner* — Tauqir Hussain
(74) *Attorney, Agent, or Firm* — Kilpatrick Townsend & Stockton LLP

(57) ABSTRACT

Customized policy decision point (PDP) services for policy-based access control systems can be generated according to some examples. In one example, a system can select an access control policy to apply to an access request received from a client that is attempting to access a computing resource. In response to selecting the access control policy, the system can select a code block from among a group of code blocks based on the access control policy. The system can then generate a customized PDP service by incorporating the code block into a PDP template, the customized PDP service being configured to execute the code block for applying the access control policy to the access request.

20 Claims, 4 Drawing Sheets

(56) References Cited

U.S. PATENT DOCUMENTS

2021/0097194 A1* 4/2021 Khanduja ............ G06F 16/2433
2022/0292191 A1* 9/2022 Sasaki .................. G06F 21/554

OTHER PUBLICATIONS

"Implementing a PEP", https://docs.aws.amazon.com/prescriptive-guidence/latest/saas-multitenant-api-access-authorization/pep.html, Amazon Web Services, Inc., 2022; pp. 1-2.

* cited by examiner

GENERATING CUSTOMIZED POLICY DECISION POINT SERVICES FOR CONTROLLING ACCESS TO COMPUTING RESOURCES

TECHNICAL FIELD

The present disclosure relates generally to policy-based access control systems for computer networks. More specifically, but not by way of limitation, this disclosure relates generating customized policy decision point services in policy-based access control systems.

BACKGROUND

Policy-based access control systems are systems used to regulate access to computing resources. Policy-based access control systems may utilize access control policies to allow or deny a user access to the computing resources. The access control policies may be used to regulate access based on roles, permissions, or other factors associated with the user requesting access or the requested computing resources. In some instances, users may submit access requests for accessing a computing resource (e.g., a network resource) to the policy-based access control system. The policy-based access control system may determine applicable access control policies for the access request and may apply the access control policies to the access requests to determine if the user is allowed to access the computing resource.

DETAILED DESCRIPTION

Figure 1:
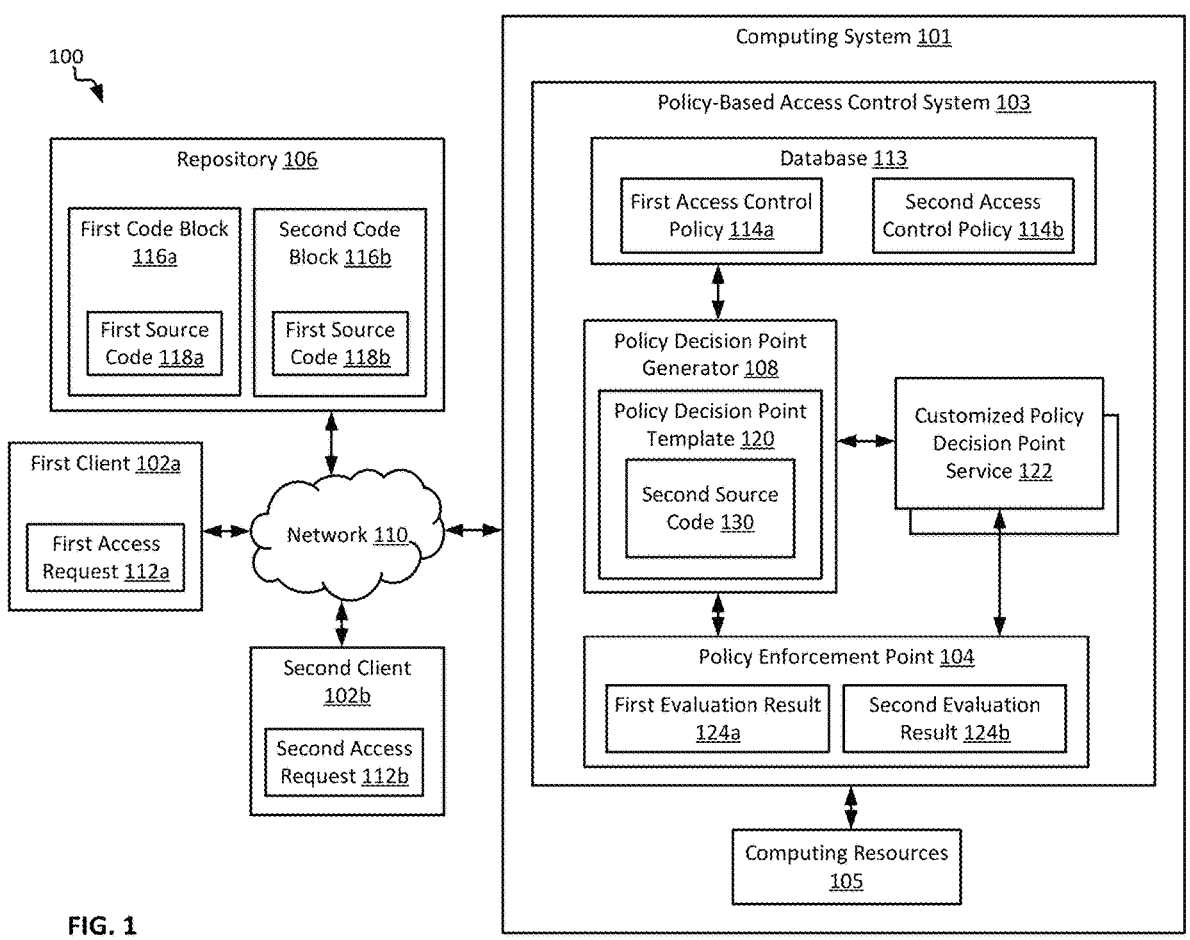
FIG. 1 shows a block diagram of an example of a system for generating a customized policy decision point service according to some aspects of the present disclosure.

Policy-based access control systems are becoming increasingly popular for use in protecting computing resources from unauthorized access. The policy-based access control system may rely on access control policies to determine whether to allow or deny an access request. There may be a large number of access control policies governing a wide variety of situations. As the volume of access control policies grows, the corresponding logic needed to capture and enforce the rules may also grow. For example, each new access control policy added to the policy-based access control system may require multiple if/else statements to also be incorporated into a policy decision point (PDP), producing increasingly complex decision trees. The PDP may compare the access request to the if/else statements in the decision trees to generate a decision for the access request. Traversing such complex decision trees to evaluate access requests may consume a significant amount of computing resources, which can be particularly problematic for resource constrained devices with limited computing resources (e.g., processing power, memory, and storage space). In such situations, the resource constrained devices may become overloaded which may introduce latency, errors, and other problems. For example, it may be difficult to maintain near real-time response times if the policy-based access control system is deployed on a resource constrained device.

Some examples of the present disclosure can overcome one or more of the abovementioned problems by generating a customized PDP service to evaluate an access request in a policy-based access control system. The customized PDP service may include a limited set of code specifically selected for use in evaluating a particular access request received from a client. In some examples, the customized PDP may consist only of the code necessary to evaluate the particular access request. After generating the customized PDP service, the customized PDP service may be deployed as a lightweight microservice. When the policy-based access control system receives the particular access request again, the access request may be routed to the customized PDP service for evaluation (e.g., instead of being routed to a conventional PDP, which may include a much larger amount of code designed to cover many different access control situations). By evaluating access requests via the customized PDP service rather than a conventional PDP, which can include all logic for all access control policies, the policy-based access control system can be more lightweight and can decrease usage of limited computing resources. Additionally, generating a customized PDP service and using the customized PDP service to evaluate an access request may be faster than executing a conventional PDP that is configured to traverse a complex decision tree. Using existing customized PDP services for subsequent access requests can further reduce response times.

In one particular example, a client may transmit an access request to a policy enforcement point (PEP) within a policy-based access control system. The PEP may receive access requests and enforce evaluation results for the access requests. The access request may be a request for connecting the client to a Wi-Fi network. The PEP may transmit the access request to a policy decision point (PDP) generator. Prior to receiving the request, the policy-based access control system may not be executing any customized PDP services. In response to receiving the access control request, the PDP generator can automatically generate a customized PDP service for evaluating the access request. To do so, the PDP generator can access a set of access control policies governing access to computing resources, such as the Wi-Fi network. The PDP generator may select one or more of the access control policies that apply to the access request. An access control policy may apply to the access request if the access control policy relates to the client (e.g., the user or client device) that submitted the access request, the computing resource (e.g., the Wi-Fi network) being requested, the action to be performed (e.g., connecting the client to the Wi-Fi network), or any combination of these. Having selected the one or more access control policies, the PDP generator can generate a customized PDP service for the access request by incorporating code blocks associated with the applicable access control policies into a PDP template. The PDP template can be a predefined skeleton template that includes a limited set of code for performing a limited set of required functions that may be common among some or all of the access control policies. Once the code blocks are incorporated into the PDP template, the result may be a customized set of code configured for deploying the customized PDP service. The PDP generator can then deploy the customized PDP service, for example by compiling the customized set of code into an executable file and running the executable file. After being deployed, the customized PDP service can evaluate the access request by executing the code blocks in relation to the access request to generate an evaluation result. The customized PDP service can transmit the evaluation result to the PEP, which can grant or deny access to the Wi-Fi network for the client based on the evaluation result.

Continuing with the above example, subsequent access requests for connecting the client to the Wi-Fi network may also be evaluated by the customized PDP service that is already running. The PDP generator may generate customized PDP services for each unique type of access request that it receives from the same client or different clients. In some examples, the PDP generator may update an existing customized PDP service to incorporate additional code blocks for evaluating additional types of access requests. The customized PDP service can therefore evolve over time. In some examples, the PDP generator may shut down a customized PDP service in response to detecting certain events. For example, a customized PDP service may be shut down after a predetermined period of inactivity has been exceeded. Alternatively or additionally, a customized PDP service may be shut down in response to the consumption of a computing resource (e.g., memory or processing power) exceeding a predetermined threshold. In this way, the policy-based access control system can dynamically monitor conditions in the system to generate and shut down customized PDP services to reduce the consumption of computing resources and to reduce latency.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 shows a block diagram of an example of a system 100 for generating a customized policy decision point (PDP) service 122 according to some aspects of the present disclosure. The system 100 includes clients 102a-b, a computing system 101, and a repository 106 that are in communication via a network 110, such as a local area network or the Internet. Examples of the clients 102a-b can include laptop computers, desktop computers, servers, or mobile phones. Examples of the computing system 101 can include a cloud computing system, a computing cluster, and a data grid. The computing system 100 may include one computing device or multiple computing devices in communication with each other via one or more networks (e.g., a local area network). Examples of such computing devices can include servers, desktop computers, or the like.

The computing system 101 includes a policy-based access control system 103 governing access to computing resources 105. Examples of the policy-based access control system 103 can include role-based access control (RBAC) systems, organization-based access control (OrBAC) systems, attribute-based access control (ABAC) systems, or any other access control systems.

The policy-based access control system 103 can include a policy enforcement point (PEP) 104 and a policy decision point (PDP) generator 108. The PEP 104 can receive access requests 112 from clients, such as the first client 102a or the second client 102b. In some examples, the access request 112 may specify a particular computing resource 105 that is being requested, the client (e.g., user or client device) that is requesting access to the computing resource 105, an action to be performed with respect to the particular computing resource 105, or any combination of these. The PEP 104 can also grant or deny access to the computing resource 105 requested in the access request 112. In some examples, the policy-based access control system 103 can use a customized PDP service 122 to determine whether or not to grant a client access to a computing resource 105. For example, after the PEP 104 receives a first access request 112a from the first client 102a, the PEP 104 can determine if an existing customized PDP service 122 exists that can evaluate the first access request 112a. If so, the customized PDP service 122 can be used to evaluate the first access request 112a. If there is not an existing customized PDP service 122, the PEP 104 can direct the PDP generator 108 to generate a customized PDP service 122 and use that customized PDP service 122 to evaluate the first access request 112a.

The PDP generator 108 can rely on access control policies 114 for implementing some features described herein. There may be any number and combination of access control policies 114 usable by the PDP generator 108. The access control policies 114 may be included in a database 113, which may be internal to the PDP generator 108 or may be separate from and accessible to the PDP generator 108. Each of the access control policies 114 can include rules dictating access to one or more computing resources 105. Different access control policies can correspond to different access control situations and include rules governing those situations.

To generate a customized PDP service 122 based on the first access request 112a, the PDP generator 108 can select an access control policy 114 that is applicable to the first access request 112a. For example, if the first access request 112a is a request to delete a particular file, the PDP generator 108 may select a first access control policy 114a relating to the first client 102a, the particular file, and the deleting action.

Each access control policy 114 may have an associated code block 116 stored in a repository 106. For example, the first access control policy 114a may correspond to a first code block 116a stored in the repository 106. First code block 116a can include first source code 118a for applying the first access control policy 114a to the first access request 112a. For example, the first source code 118a can include the logic required for the first access control policy 114a. The logic may include if/else statements that can be used to determine a first evaluation result 124a for the first access request 112a. After selecting the first access control policy 114a, the PDP generator 108 can select code block 116 based on the first access control policy 114a. For example, the PDP generator 108 may select the first code block 116a by accessing a lookup table that maps code blocks with identification numbers for access control policies.

In some examples, the repository 106 may be internal to the policy-based access control system 103 or separate from the policy-based access control system 103 and accessible to it via a network 110 (e.g., the Internet). For example, the repository 106 may be a Git repository or part of another code development system that is remote from the policy-based access control system 103. In some examples in which the repository 106 is a Git repository, the PDP generator 108 can issue a Git pull command to access a selected code block 116. The repository 106 may be a graph database, another type of database, or any other suitable type of storage mechanism.

After obtaining the first code block 116a, the PDP generator 108 can then generate the customized PDP service 122 by incorporating the first source code 118a from the first code block 116a into a PDP template 120. The PDP template 120 can be a predefined, skeleton PDP that includes the minimum amount of base logic necessary to function and help evaluate access requests 112. For example, the PDP template 120 may include second source code 130 for creating application programming interface (API) pathways for interacting with components of the policy-based access control system 103, creating connections with the database 113 storing the access control policies 114, and evaluating access requests 112 by applying the access control policies 114. The customized PDP service 122 can be generated by incorporating the first source code 118a into the second source code 130 of the PDP template 120. This may produce a combined set of custom code, which may then be interpreted by an interpreter or compiled and executed to deploy the customized PDP service 122 in the computing system 101.

In some examples, the PDP generator 108 may generate a distributed customized PDP service 122. For example, the PDP generator 108 may select a policy set that is applicable to the first access request 112a. The policy set may include multiple interrelated access control policies 114. The PDP generator 108 may generate and deploy multiple standalone microservices that can each evaluate an aspect of the policy set. Each of the standalone microservices may be generated based on one or more corresponding code blocks 116 retrieved from the repository 106. For example, the microservices may each include logic (e.g., if/else statements) retrieved from the repository 106 for evaluating individual access control policies 114 in the policy set. In some such examples, the PDP generator 108 may deploy the PDP template 120 as a centralized microservice, without incorporating the associated code blocks 116 therein, that can coordinate execution of the other related microservices. For example, the centralized microservice may communicate with the other microservices via APIs to coordinate their execution and determine an evaluation result 124 for the policy set.

As noted above, the customized PDP service 122 can be deployed by the PDP generator 108. The customized PDP service 122 can be a lightweight service that can be capable of running on any device, including resource-constrained devices such as a Raspberry Pi. In some examples, the customized PDP service 122 can be deployed in a container (e.g., a Docker container) or a virtual machine within the computing system 101, which can be a distributed computing environment. In some examples, the customized PDP service 122 can be deployed on a same computing device as the PDP generator 108. In other examples, the PDP generator 108 may transmit commands to another computing device in the computing system 101 to cause the other computing device to deploy the customized PDP service 122 thereon.

After the customized PDP service 122 has been deployed, the first access request 112a can be routed to the customized PDP service 122 by the PEP 104 or the PDP generator 108. The customized PDP service 122 can evaluate the first access request 112a by executing the first source code 118a and the second source code 130 to generate a first evaluation result 124a. For example, the first evaluation result 124a may recommend granting or denying access to the computing resource 105 requested in the first access request 112a. The customized PDP service 122 can transmit the first evaluation result 124a to the PEP 104 for enforcement. The PEP 104 can grant or deny the first client 102a access to the computing resource 105 based on the first evaluation result 124a.

In some examples, the PEP 104 or the PDP generator 108 may determine that an existing customized PDP service 122 exists for a second access request 112b received from the second client 102b. The second access request 112b may be recited after the first access request 112a is received. If an appropriate customized PDP service 122 already exists, rather than generating a new customized PDP service 122 (which may waste computing resources), the PEP 104 or the PDP generator 108 can route the second access request 112b to the existing customized PDP service 122 for evaluation. This can conserve computing resources.

In some examples, PEP 104 or the PDP generator 108 may determine if an existing customized PDP service 122 can be updated for evaluating the second access request 112b. For example, the second access request 112b may include the same resource and action, but a different client 102b, than the first access request 112a for which the customized PDP service 122 was generated. Since updating the customized PDP service 122 may use less computing resources than generating an additional customized PDP service 122 for the second access request 112b, it may be desirable to simply update the existing customized PDP service 122 rather than spawning a new one. So, the PDP generator 108 can select a second access control policy 114b involving the different client for the second access request 112b, and can request a second code block 116b from the repository 106. The second code block 116b can correspond to the second access control policy 114b and include first source code 118b for executing the second access control policy 114b. The PDP generator 108 can then incorporate the first source code 118b into the code for the existing customized PDP service 122 and can redeploy the customized PDP service 122 to evaluate the second access request 112b.

In some examples, the customized PDP service 122 can be automatically shut down in response to detecting certain events. One example of such an event can be the evaluation of an access request 112. In some such examples, the customized PDP service 122 can be automatically shut down upon completing an evaluation of the access request 112. The customized PDP service 122 may be shut down by the PDP generator 108 or another component of the computing system 101. Another example of an event can include the passage of a predefined time period. For example, the PEP 104 or the PDP generator 108 may monitor inactivity periods during which the customized PDP service 122 is not used to evaluate access requests 112. If an inactivity period exceeds a predetermined threshold, the PDP generator 108 may automatically shut down the customized PDP service 122. Yet another example of an event can include the consumption of a computing resource exceeding a predefined threshold. For example, the PEP 104 or the PDP generator 108 may monitor resource usage of the computing system 101. If resource usage exceeds a predetermined threshold, which may suggest excess memory storage or processing usage, the PDP generator 108 may automatically may shut down the customized PDP service 122.

Shutting down the customized PDP service 122 may involve stopping the running processes associated with the customized PDP service 122. Any corresponding files, such as executable files, libraries, the first source code 118a, the second source code 130, or any combination of these, may also be deleted (e.g., from the computing device on which the customized PDP service 122 is deployed).

In some examples, the customized PDP service 122 may be migrated between computing devices in response to certain detected events. For example, the policy-based access control system 103 may be deployed in a distributed computing environment that includes multiple nodes. In some examples, one or more customized PDP services 122 may be deployed on a first node, which may be a resource constrained device. The PEP 104 or the PDP generator 108 may determine that resource usage for the first node exceeds a predetermined threshold. The PEP 104 or the PDP generator 108 may also determine that resource usage for a second node may not exceed the predetermined threshold. So, the PDP generator 108 may shut down the customized PDP service 122 on the first node and deploy the customized PDP service 122 on the second node, effectively migrating the customized PDP service 122 from the first node to the second node.

Although FIG. 1 shows a particular number and combination of components, this is intended to be illustrative and non-limiting. Other examples may include more components, fewer components, different components, or a different combination of components than is shown in FIG. 1. For example, although the system 100 includes two clients, one database with two access control policies, and one repository with two code blocks, the system 100 may include any number of clients, databases, repositories, code blocks, or access control policies in other examples.

Figure 2:
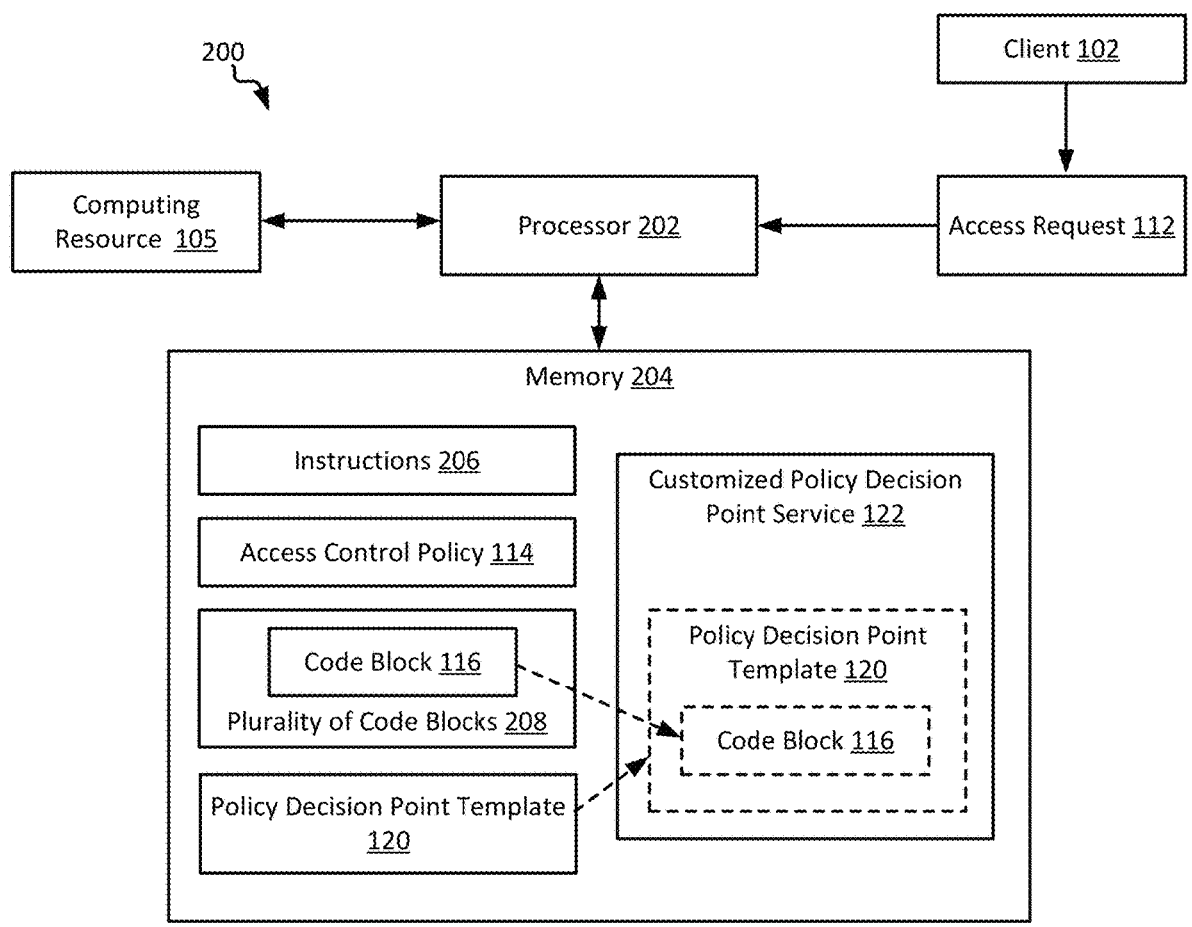
FIG. 2 shows a block diagram of another example of a system for generating a customized policy decision point service according to some aspects of the present disclosure.

FIG. 2 shows a block diagram of another example of a system 200 for generating a customized policy decision point (PDP) service 122 according to some aspects of the present disclosure. The system 200 includes a processor 202 that is communicatively coupled to a memory 204. In some examples, the processor 202 and the memory 204 can be part of the same computing device. In other examples, the processor 202 and the memory 204 can be distributed from (e.g., remote to) one another.

The processor 202 can include one processor or multiple processors. Examples of the processor 202 include a Field-Programmable Gate Array (FPGA), an application-specific integrated circuit (ASIC), a microprocessor, etc. The processor 202 can execute instructions 206 stored in the memory 204 to perform operations. The instructions 206 may include processor-specific instructions generated by a compiler or an interpreter from code written in any suitable computer-programming language, such as C, C++, C#, and Java.

The memory 204 can include one memory or multiple memories. The memory 204 can be non-volatile and may include any type of memory that retains stored information when powered off. Examples of the memory 204 include electrically erasable and programmable read-only memory (EEPROM), flash memory, or any other type of non-volatile memory. At least some of the memory 204 can include a non-transitory computer-readable medium from which the processor 202 can read instructions 206. A computer-readable medium can include electronic, optical, magnetic, or other storage devices capable of providing the processor 202 with computer-readable instructions or other program code. Examples of computer-readable mediums include magnetic disks, memory chips, ROM, random-access memory (RAM), an ASIC, a configured processor, optical storage, or any other medium from which a computer processor can read the instructions 206.

The processor 202 can execute the instructions 206 to perform operations. For example, the processor 202 can select an access control policy 114 to apply to an access request 112 received from a client 102 that is attempting to access a computing resource 105. In response to selecting the access request 112, the processor 202 can select a code block 116 from among a plurality of code blocks 208 based on the access control policy 114. The processor 202 can also generate a customized policy decision point (PDP) service 122 by incorporating the code block 116 into a PDP template 120 in response to selecting the access request 112. This is depicted in FIG. 2 by the dashed arrows. The customized PDP service 122 can be configured to execute the code block 116 for applying the access control policy 114 to the access request 112.

Figure 3:
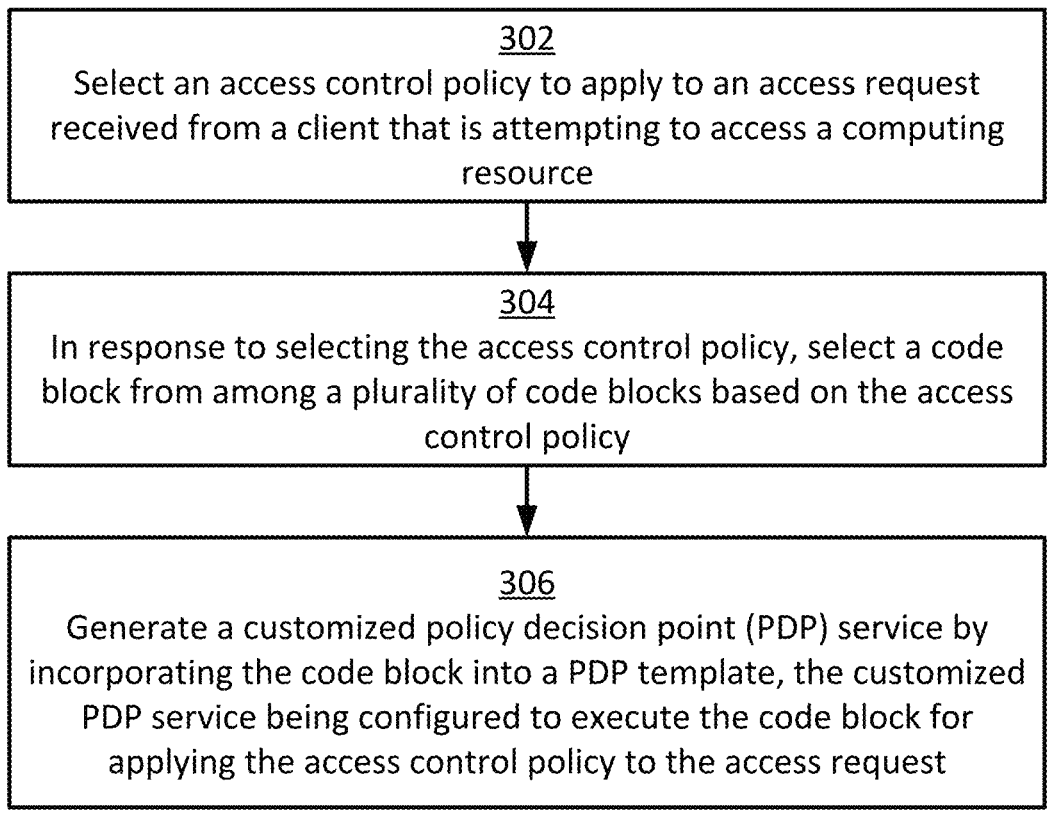
FIG. 3 is a flow chart of an example of a process for generating a customized policy decision point service in a policy-based access control system according to some aspects of the present disclosure.
Figure 4:
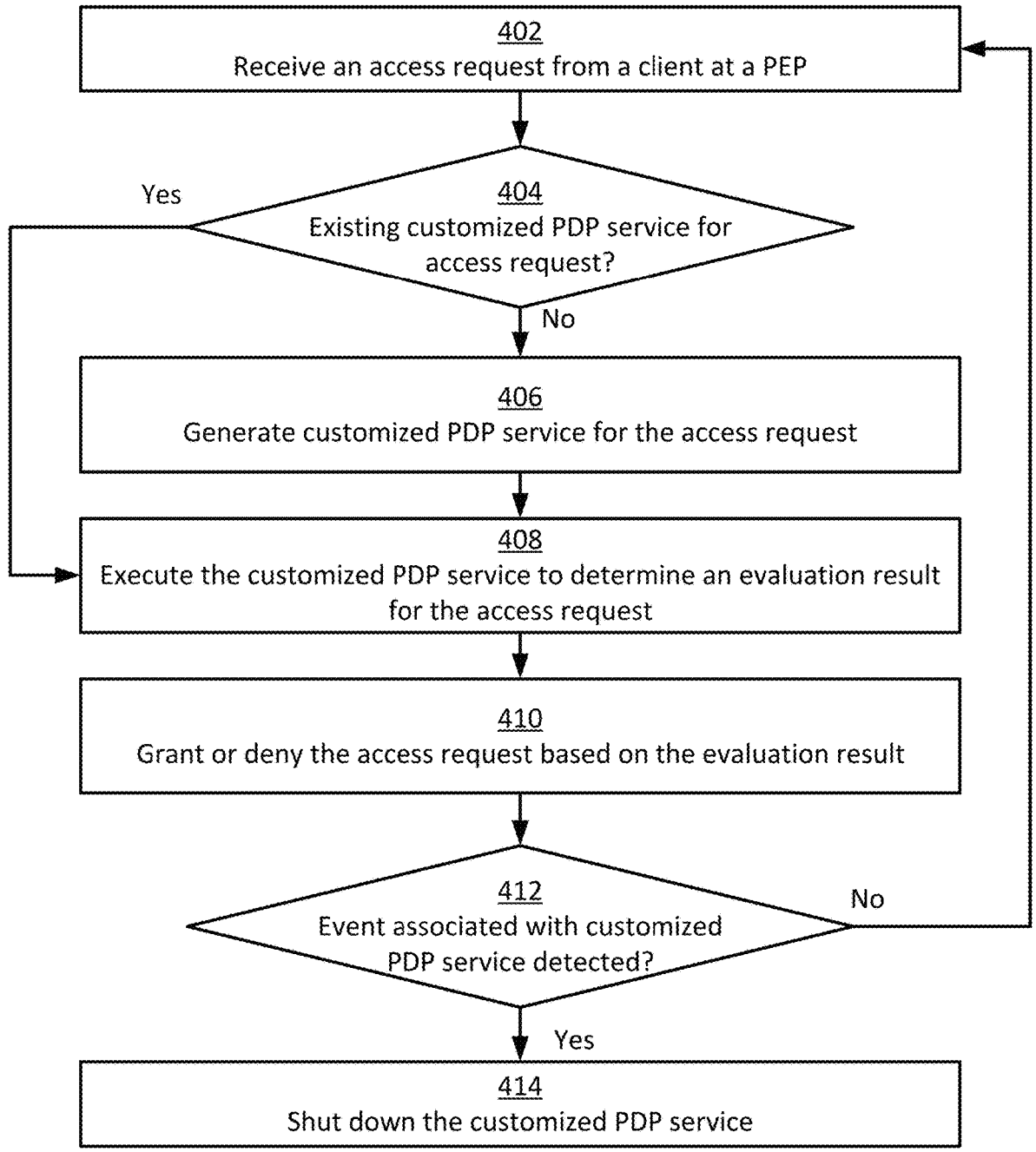
FIG. 4 is a flow chart of an example of a process for using a customized policy decision point (PDP) service to evaluate an access request to evaluate an access request for a policy-based access control system according to some aspects of the present disclosure.

In some examples, the processor 202 can implement some or all of the steps shown in FIGS. 3-4. Other examples may involve more steps, fewer steps, different steps, or a different order of the steps than is shown in FIGS. 3-4. The steps of FIGS. 3-4 are described below with reference to components described above with regard to FIGS. 1-2.

Turning to FIG. 3, at block 302, the processor 202 selects an access control policy 114 to apply an access request 112 received from a client 102 that is attempting to access a computing resource 105. For example, the access request 112 may be received from the first client 102a of FIG. 1. Examples of computing resources 105 can include files, folders, applications and other software, and hardware (e.g., processors, memory, and storage). In one example, the access request 112 may be a request for the client 102 to delete a particular file. The processor 202 may select the access control policy 114 based on attributes of the access request 112, such as the particular resource that is requested, the source of the access request 112, and the action for the particular resource that is being requested. For example, the processor 202 may select an access control policy 114 that dictates which authorized clients have permission to edit or delete to the particular file.

At block 304, in response to selecting the access control policy 114, the processor 202 selects a code block 116 from among a plurality of code blocks 208 based on the access control policy 114. The code block 116 may be associated with the selected access control policy 114. The code block 116 may include first source code 118a that can be executed to evaluate the access request 112 against the access control policy 114. For example, the first source code 118a may include if/else statements and other logic that can be executed to determine if the client 102 is authorized to edit the particular file.

At block 306, in response to selecting the access control policy 114, the processor 202 generates a customized PDP service 122 by incorporating the code block 116 into a PDP template 120. The PDP template 120 may include second source code 130 that can be executed to provide default functionality for the customized PDP service 122. The processor 202 can incorporate the first source code 118a of the code block 116 into the second source code 130 of the PDP template 120 to generate the customized PDP service 122. The processor 202 can then deploy the customized PDP service 122, which can be configured to execute the code block 116 for applying the access control policy 114 to the access request 112. For example, the customized PDP service 122 may execute the first source code 118a and the second source code 130 to generate an evaluation result 124. The evaluation result 124 may deny the access request 112 based on the client 102 not being an authorized client with permission to delete the particular file.

Referring now to FIG. 4, shown is an example of a process for using a customized policy decision point (PDP) service to evaluate an access request for a policy-based access control system. The process can being at block 402, where the processor 202 receives an access request 112 from a client 102 at a PEP 104. The processor 202 can receive the access request 112 via a network 110, such as the Internet. In one example, the access request 112 may be a request for a client 102 to view a database.

At block 404, the processor 202 (e.g., one or more processors) can determine if a customized PDP service 122 associated with the access request 112 exists. For example, the processor 202 can determine one or more access control policies 114 associated with the access request 112. The processor 202 can then determine if a customized PDP service 122 that includes a code block 116 associated with the one or more access control policies 114 exists. If the customized PDP service 122 exists, the process continues to block 408. If the customized PDP service 122 does not exist, the process continues to block 406.

At block 406, the processor 202 can generate a customized PDP service 122 for the access request 112. For example, the processor 202 can select an access control policy 114 based on the access request 112. The access control policy 114 can include a rule governing access to a computing resource 105 requested in the access request 112. For example, the processor 202 may select one or more access control policies 114 involving the client 102, the database, and viewing privileges for the database. Based on selecting the access control policy 114, the processor 202 can then select a code block 116 associated with the access control policy 114. The code block 116 can include logic for applying the access control policy 114 to the access request 112. In some examples, the processor 202 may retrieve the code block 116 over a network 110 from a repository 106 storing multiple code blocks. The processor 202 can generate the customized PDP service 122 by incorporating the code block 116 into a PDP template 120 that includes the default functionality for executing the customized PDP service 122. The processor 202 can then deploy the customized PDP service 122 onto a node, which may be internal or external to the computing system 101. In some examples, the customized PDP service 122 can be deployed onto an edge of a distributed computing system to be close to the computing resource (e.g., the database).

At block 408, the processor 202 can execute the customized PDP service 122 to determine an evaluation result 124 for the access request 112. Executing the customized PDP service 122 can involve executing the code block 116 to apply the access control policy 114 to the access request 112. For example, the processor 202 can generate an evaluation result 124 that recommends approving the access request 112, based on executing the code block 116 to determine that the client 102 is an authorized viewer of the database. The processor 202 can transmit the evaluation result 124 to the PEP 104.

At block 410, the processor 202 can grant or deny the access request 112 based on the evaluation result 124. For example, the processor 202 may operate the PEP 104 to grant the client 102 with access to view the database. The PEP 104 can, for example, execute a function that makes the database viewable for the client 102.

At block 412, the processor 202 can determine if an event associated with the customized PDP service 122 has been detected. The event may indicate that the customized PDP service 122 should be shut down. For example, the processor 202 may determine that the customized PDP service 122 has not been executed to evaluate an access request 112 for an amount of time that exceeds a predetermined threshold, such as one week. In another example, the processor 202 may determine that consumption of computing resources for executing the customized PDP service 122 exceeds a predetermined threshold. If an event has not been detected, the process can continue to block 402. If an event has been detected, the process can continue to block 414.

At block 414, the processor 202 can shut down the customized PDP service 122. For example, the processor 202 can switch off the customized PDP service 122 and can delete one or more corresponding files from the node onto which the customized PDP service 122 was deployed. The processor 202 may re-generate and re-deploy the customized PDP service 122 at a later time, for example if an access request 112 associated with the first source code 118a is requested again.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, examples described herein can be combined together to yield still further examples.

The invention claimed is:

1. A non-transitory computer-readable medium comprising program code that is executable by a processor for causing the processor to:
   select an access control policy to apply to an access request received from a client that is attempting to access a computing resource; and
   in response to selecting the access control policy:
      select a code block from among a plurality of code blocks based on the access control policy, wherein the code block includes first source code configured for evaluating access requests from clients against the access control policy; and
      generate a customized policy decision point (PDP) service by incorporating the first source code of the code block into second source code of a PDP template, wherein the second source code is configured to provide default functionality for the customized PDP service, the customized PDP service being configured to execute the code block for applying the access control policy to the access request.

2. The non-transitory computer-readable medium of claim 1, further comprising program code that is executable by the processor for causing the processor to:
   receive the access request from the client; and
   subsequent to receiving the access request from the client, deploy the customized PDP service.

3. The non-transitory computer-readable medium of claim 2, further comprising program code that is executable by the processor for causing the processor to:
   select the access control policy from among a plurality of access control policies based on the computing resource.

4. The non-transitory computer-readable medium of claim 3, further comprising program code that is executable by the processor for causing the processor to:
   retrieve the code block over a network from a repository including the plurality of code blocks, each code block in the plurality of code blocks corresponding to a respective access control policy of the plurality of access control policies.

5. The non-transitory computer-readable medium of claim 3, further comprising program code that is executable by the processor for causing the processor to:

configure a policy enforcement point to grant or deny the access request based on an evaluation result received from the customized PDP service, the customized PDP service being configured to determine the evaluation result for the access request by executing the code block.

6. The non-transitory computer-readable medium of claim 2, further comprising program code that is executable by the processor for causing the processor to, subsequent to deploying the customized PDP service:
detect an event associated with the customized PDP service; and
in response to detecting the event, shut down the customized PDP service.

7. A method comprising:
selecting, by a processor, an access control policy to apply to an access request received from a client that is attempting to access a computing resource; and
in response to selecting the access control policy:
selecting, by the processor, a code block from among a plurality of code blocks based on the access control policy, wherein the code block includes first source code configured for evaluating access requests from clients against the access control policy; and
generating, by the processor, a customized policy decision point (PDP) service by incorporating the first source code of the code block into second source code of a PDP template, wherein the second source code is configured to provide default functionality for the customized PDP service, the customized PDP service being configured to execute the code block for applying the access control policy to the access request.

8. The method of claim 7, further comprising:
receiving the access request from the client; and
subsequent to receiving the access request from the client, deploying the customized PDP service.

9. The method of claim 8, further comprising:
selecting the access control policy from among a plurality of access control policies based on the computing resource.

10. The method of claim 9, further comprising:
retrieving the code block over a network from a repository including the plurality of code blocks, each code block in the plurality of code blocks corresponding to a respective access control policy of the plurality of access control policies.

11. The method of claim 9, further comprising:
configuring a policy enforcement point to grant or deny the access request based on an evaluation result received from the customized PDP service, the customized PDP service being configured to determine the evaluation result for the access request by executing the code block.

12. The method of claim 8, further comprising, subsequent to deploying the customized PDP service:
detecting an event associated with the customized PDP service; and
in response to detecting the event, shutting down the customized PDP service.

13. A system comprising:
a processor; and
a non-transitory computer-readable memory comprising instructions that are executable by the processor for causing the processor to:
select an access control policy to apply to an access request received from a client that is attempting to access a computing resource; and
in response to selecting the access control policy:
select a code block from among a plurality of code blocks based on the access control policy, wherein the code block includes first source code configured for evaluating access requests from clients against the access control policy; and
generate a customized policy decision point (PDP) service by incorporating the first source code of the code block into second source code of a PDP template, wherein the second source code is configured to provide default functionality for the customized PDP service, the customized PDP service being configured to execute the code block for applying the access control policy to the access request.

14. The system of claim 13, further comprising instructions that are executable by the processor for causing the processor to:
receive the access request from the client; and
subsequent to receiving the access request from the client, deploy the customized PDP service.

15. The system of claim 14, further comprising instructions that are executable by the processor for causing the processor to:
select the access control policy from among a plurality of access control policies based on the computing resource.

16. The system of claim 15, further comprising instructions that are executable by the processor for causing the processor to:
retrieve the code block over a network from a repository including the plurality of code blocks, each code block in the plurality of code blocks corresponding to a respective access control policy of the plurality of access control policies.

17. The system of claim 15, further comprising instructions that are executable by the processor for causing the processor to:
configure a policy enforcement point to grant or deny the access request based on an evaluation result received from the customized PDP service, the customized PDP service being configured to determine the evaluation result for the access request by executing the code block.

18. The system of claim 13, further comprising instructions that are executable by the processor for causing the processor to, subsequent to deploying the customized PDP service:
detect an event associated with the customized PDP service; and
in response to detecting the event, shut down the customized PDP service.

19. The non-transitory computer-readable medium of claim 1, further comprising program code that is executable by the processor for causing the processor to:
generate the customized PDP service by:
generating combined source code that includes the first source code and the second source code; and
compiling the combined source code into a file; and
deploy the customized PDP service by executing the file.

20. The method of claim 7, further comprising:
generating the customized PDP service by:
generating combined source code that includes the first source code and the second source code; and compiling the combined source code into a file; and
deploying the customized PDP service by executing the file.

* * * * *